United States Patent
Tagaki

(10) Patent No.: US 9,961,226 B2
(45) Date of Patent: May 1, 2018

(54) IMAGE FORMING SYSTEM THAT HANDS OVER OPERATION FROM PORTABLE TERMINAL TO IMAGE FORMING APPARATUS AND IMAGE FORMATION METHOD

(71) Applicant: KYOCERA Document Solutions Inc., Osaka (JP)

(72) Inventor: Koji Tagaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days. days.

(21) Appl. No.: 14/694,818

(22) Filed: Apr. 23, 2015

(65) Prior Publication Data
US 2015/0312434 A1    Oct. 29, 2015

(30) Foreign Application Priority Data
Apr. 23, 2014    (JP) .................................. 2014-089046

(51) Int. Cl.
H04N 1/00    (2006.01)

(52) U.S. Cl.
CPC ..... *H04N 1/00973* (2013.01); *H04N 1/00204* (2013.01); *H04N 1/00307* (2013.01); *H04N 1/00411* (2013.01)

(58) Field of Classification Search
CPC ............... H04N 1/0413; H04N 1/0482; H04N 2201/0075; H04N 1/00973; H04W 4/02; H04W 8/24; G06F 1/3206; G06F 1/3265; G06F 1/3212; G06F 1/3234; G06F 3/1454
See application file for complete search history.

(56) References Cited

U.S. PATENT DOCUMENTS 5,699,494 A *  12/1997  Colbert ................. G06F 3/1293
                                                           358/1.13
9,014,763 B2 *  4/2015  Jung ........................ H04B 7/26
                                                           455/158.4

(Continued)

FOREIGN PATENT DOCUMENTS

JP    2002-047839 A    2/2002
JP    2014-187575 A    10/2014

*Primary Examiner* — Ted Barnes
(74) *Attorney, Agent, or Firm* — Hawaii Patent Services; Nathaniel K. Fedde; Kenton N. Fedde

(57) ABSTRACT

Provided is an image forming system that hands over an operation information on a portable terminal to an image forming apparatus and operates it, if the portable terminal is likely to become battery exhaustion. The portable terminal determines battery exhaustion if battery residual quantity of the portable terminal becomes less than or equal to a prescribed threshold value while accepting setting operation to the image forming apparatus. Then, handing over information (sizing information, color-balance setup information, and image quality setting operation screen information) for handing over operation to the image forming apparatus is automatically transmitted to the image forming apparatus. The image forming apparatus receives the handing over information from the portable terminal. In that case, based on the handing over information, operation is accepted with an operation panel with continuing the setting operation performed with the portable terminal.

6 Claims, 8 Drawing Sheets

(56) References Cited

U.S. PATENT DOCUMENTS

| | | | | |
|---|---|---|---|---|
| 9,015,224 B2* | 4/2015 | Nachtrab | ............... | H04L 67/125 |
| | | | | 709/202 |
| 9,113,017 B2* | 8/2015 | Ishikawa | ............ | H04N 1/00204 |
| 2002/0033872 A1* | 3/2002 | Takahashi | ................ | B41J 29/38 |
| | | | | 347/110 |
| 2004/0253981 A1* | 12/2004 | Blume | .............. | H04M 1/72527 |
| | | | | 455/552.1 |
| 2008/0055311 A1* | 3/2008 | Aleksic | ................... | G06T 15/00 |
| | | | | 345/428 |
| 2008/0219589 A1* | 9/2008 | Jung | ................. | H04N 1/00068 |
| | | | | 382/276 |
| 2012/0310564 A1* | 12/2012 | Yamamoto | ......... | G01R 31/3606 |
| | | | | 702/63 |
| 2013/0262890 A1* | 10/2013 | Marshall | ............... | G06F 1/3212 |
| | | | | 713/320 |
| 2014/0002567 A1* | 1/2014 | Miyabayashi | ......... | B41J 3/4075 |
| | | | | 347/211 |
| 2014/0285845 A1* | 9/2014 | Ishikawa | ............ | H04N 1/00204 |
| | | | | 358/1.15 |
| 2014/0323870 A1* | 10/2014 | Satsuka | ................... | A61B 8/56 |
| | | | | 600/459 |
| 2014/0327630 A1* | 11/2014 | Burr | ...................... | G06F 3/0488 |
| | | | | 345/173 |
| 2015/0042789 A1* | 2/2015 | Inwood | ................ | G01B 11/026 |
| | | | | 348/135 |

\* cited by examiner

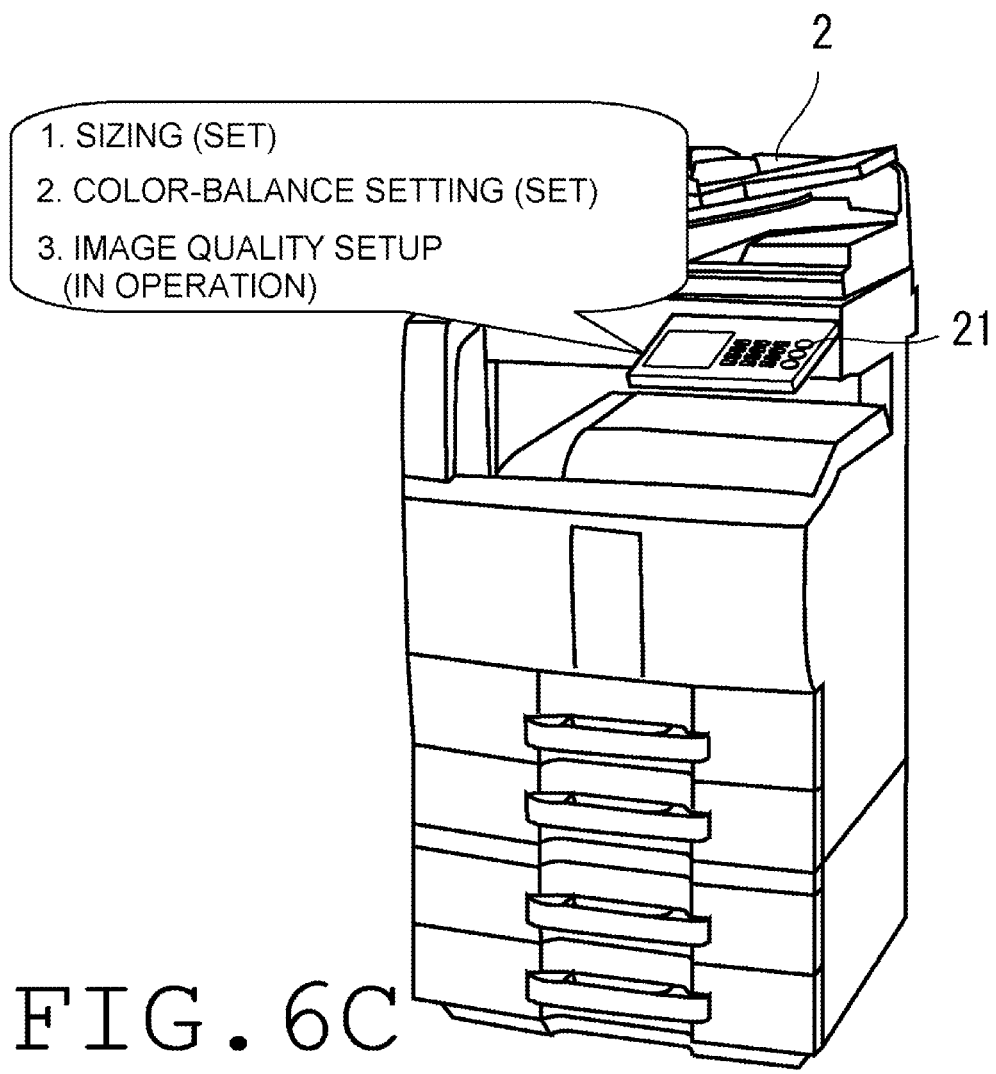

IMAGE FORMING SYSTEM THAT HANDS OVER OPERATION FROM PORTABLE TERMINAL TO IMAGE FORMING APPARATUS AND IMAGE FORMATION METHOD

INCORPORATION BY REFERENCE

This application is based on and claims the benefit of priority from Japanese Patent Application No. 2014-089046 filed on Apr. 23, 2014, the contents of which are hereby incorporated by reference.

BACKGROUND

The present disclosure is related with an image forming system provided with a portable terminal and an image forming apparatus allows operation from the portable terminal.

In a typical technology, an image forming apparatus is operational by using a portable terminal, such as a smart phone and a tablet terminal. A user can set up printing on an operation screen displayed on the portable terminal. If a determination button is pressed, a print setting is transmitted to the image forming apparatus. Thereby, based on the print setting, printed matter can be output from the image forming apparatus.

Also, as a typical example, technology for informing a battery of the portable terminal having been exhausted is proposed. If the portable terminal cannot be operated by battery exhaustion, or the like, an operation part of an image forming apparatus is operated, directly. Thereby, a print setting can be input.

SUMMARY

An image forming system of the present disclosure includes a portable terminal and an image forming apparatus that allows to operate from the portable terminal. The portable terminal has a remote control processing part. The remote control processing part transmits handing over information for handing over operation to the image forming apparatus if battery residual quantity becomes less than or equal to a prescribed threshold value. The image forming apparatus also has an operation panel. The operation panel accepts operation for continuing a setting operation performed with the portable terminal based on the handing over information received from the portable terminal.

An image formation method of the present disclosure is executed by an image forming system provided with a portable terminal and an image forming apparatus that allows to operate from the portable terminal. A handing over information for handing over operation to the image forming apparatus is transmitted by the portable terminal if battery residual quantity becomes less than or equal to a prescribed threshold value. Operation is accepted by the image forming apparatus for continuing a setting operation performed with the portable terminal based on the handing over information received from the portable terminal.

BRIEF DESCRIPTION OF THE DRAWINGS

FIG. 6C is an image figure showing a process flow of the image forming system illustrated in FIG. 1.

DETAILED DESCRIPTION

Hereinafter, with reference to figures, an embodiment of the present disclosure is described in detail. In addition, in the following embodiments, the same numerals are given to the configuration that shows a similar function.

Figure 1:
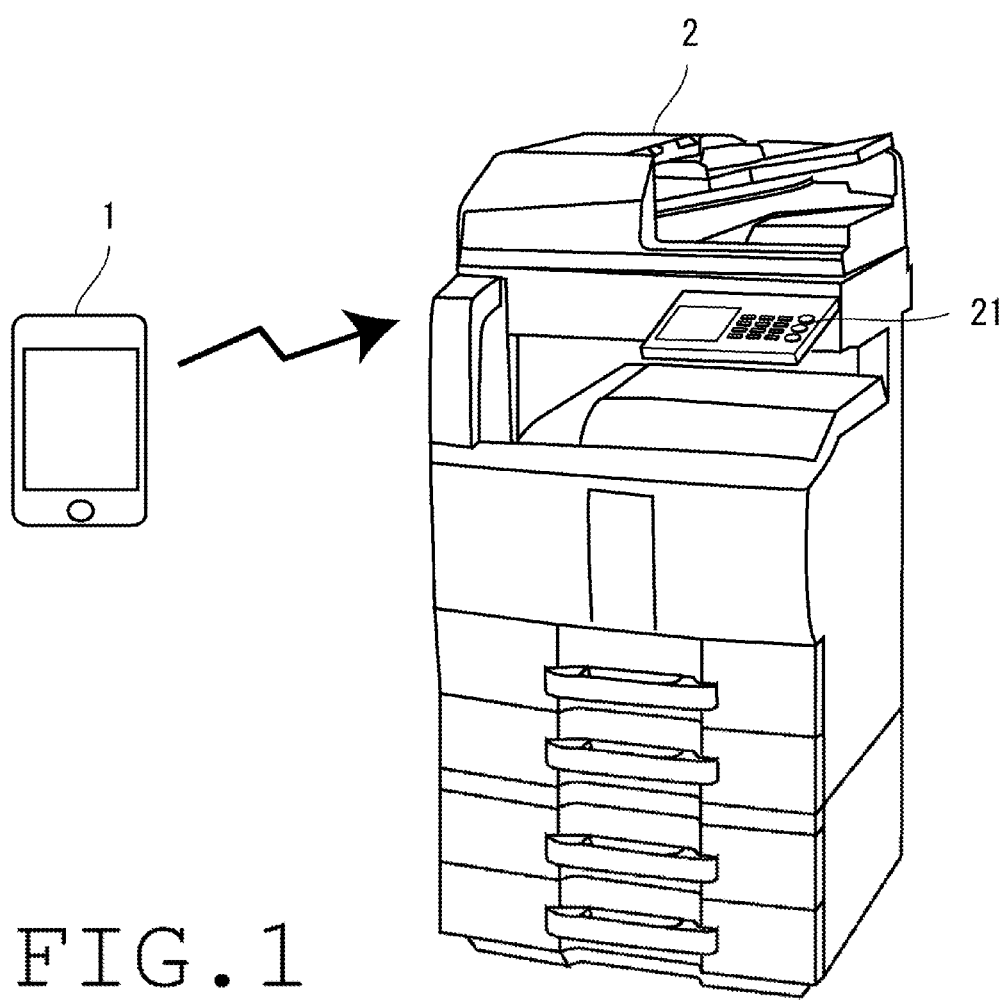
FIG. 1 is a system configuration diagram of an image forming system in the embodiment related to the present disclosure.

As shown in FIG. 1, image forming system 100 includes portable terminal 1 and image forming apparatus 2. Image forming apparatus 2 is connected to portable terminal 1 via a wireless network, or the like. Image forming apparatus 2 can be operated from portable terminal 1. Also, the operation from operation panel 21 is also possible for image forming apparatus 2.

Figure 2:
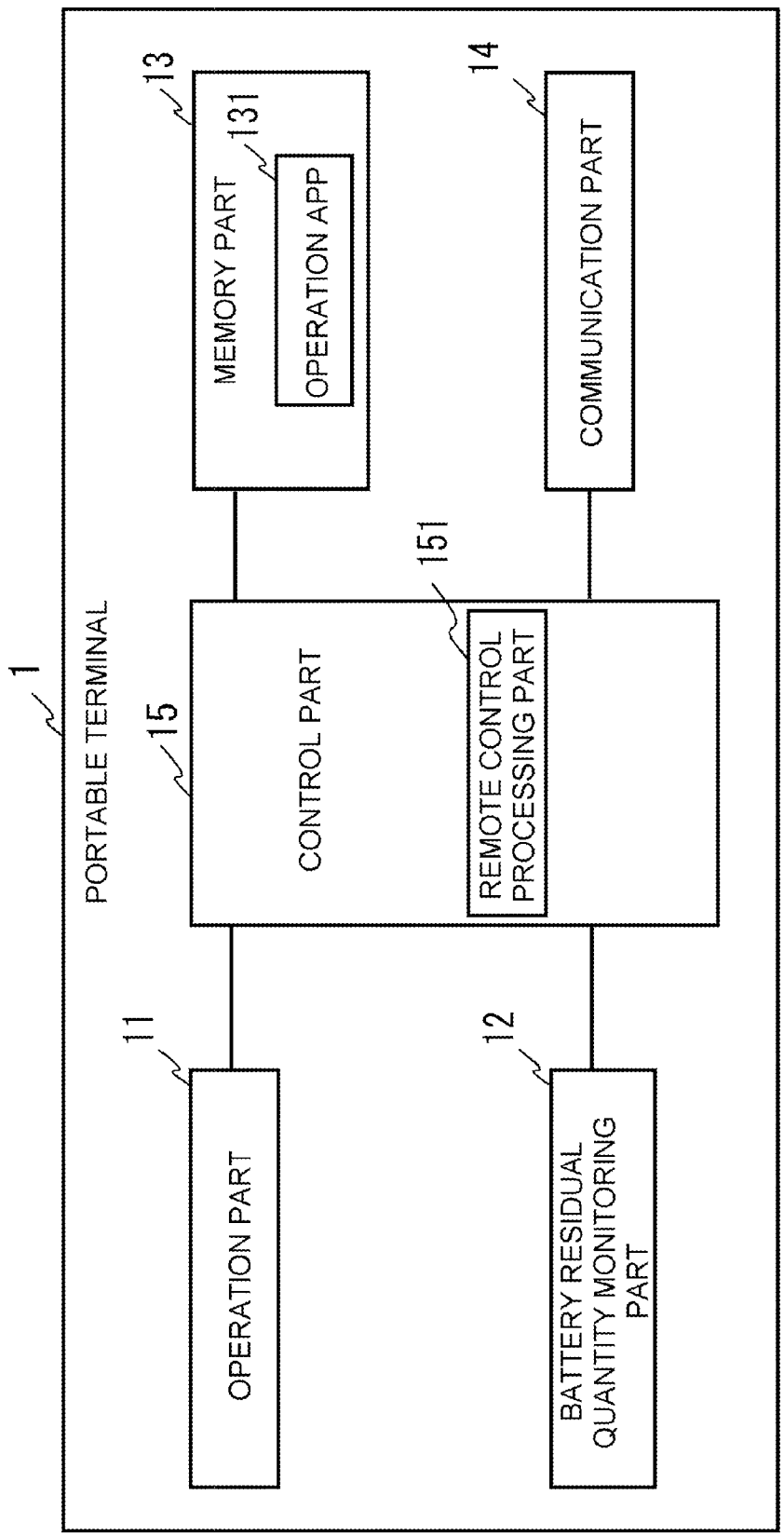
FIG. 2 is a block diagram showing a configuration of a portable terminal illustrated in FIG. 1.

Portable terminal 1 is a portable device. As shown in FIG. 2, portable terminal 1 includes operation part 11, battery residual quantity monitoring part 12, memory part 13, communication part 14, and control part 15.

Operation parts 11 are a user interface provided with a display part and various operation keys. The display part displays a variety of information. Also, operation part 11 may have a transparent touch sensor on the display panel. Thereby, operation part 11 may be a touch panel that functions as the display part and the input part.

Battery residual quantity monitoring part 12 has a function that monitors battery residual quantity of portable terminal 1.

Memory part 13 is a non-transitory recording medium. Memory part 13 memorizes operation APP (Application software) 131. Operation APP 131 is an application program for operating image forming apparatus 2 by remote control. Operation APP 131 is installed in portable terminal 1. A user can download operation APP 131 from the Internet, or the like, via communication part 14, and can install in portable terminal 1.

Communication part 14 transmits and receives various data to image forming apparatus 2. Communication part 14 has a function for transmitting and receiving via a wireless network, for example.

Control part 15 is connected to operation part 11, battery residual quantity monitoring part 12, memory part 13, and communication part 14, respectively. Control part 15 executes operation controls entire portable terminal 1 according to specified instructions information input by operation part 11. Control part 15 is an information processing part including a non-transitory recording medium. The control program for operation-controlling portable terminal 1 is memorized in the recording medium. Control part 15 reads the control program memorized in the recording medium and expands the control program. Also, control part 15 controls the entire terminal according to the specified instructions information input by operation part 11.

Also, if start operation of operation APP 131 is performed via operation part 11, control part 15 reads operation APP 131 memorized in memory part 13 and expands to the recording medium. Then, control part 15 starts expanded operation APP 131. Thereby, control part 15 functions as remote control processing part 151 for realizing the function of operation APP 131.

Remote control processing part 151 displays an operation screen that accepts setting operation to image forming apparatus 2 on operation part 11. When setting operation is completed, remote control processing part 151 transmits the accepted setting operation information to image forming apparatus 2 via communication part 14. That is, remote control processing part 151 has a function that operates image forming apparatus 2 by remote control based on the setting operation information. Also, remote control processing part 151 detects that battery residual quantity of portable terminal 1 becomes less than or equal to a prescribed threshold value via battery residual quantity monitoring part 12. Remote control processing part 151 determines it as battery exhaustion if this is detected. Remote control processing part 151 has a function that transmits, even if the setting operation is not completed, the handing over information including the setting operation information accepted by operation part 11 to image forming apparatus 2. This is for enabling to operate with operation panel 21 of image forming apparatus 2 from a continuation of the setting operation accepted by operation part 11.

Figure 3:
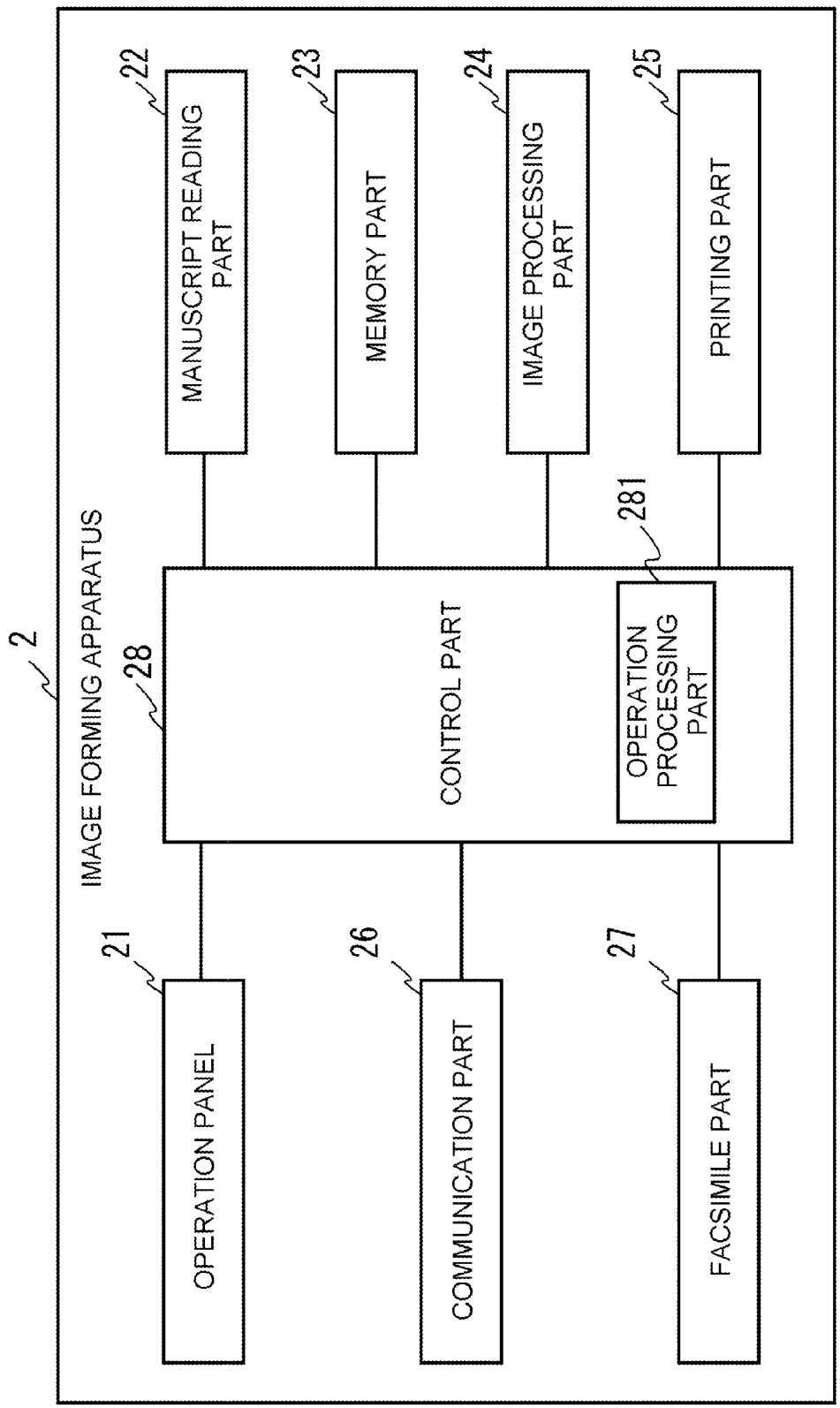
FIG. 3 is a block diagram showing a configuration of an image forming apparatus illustrated in FIG. 1.

Next, with reference to FIG. 3, image forming apparatus is explained. Image forming apparatus 2 is an MFP (Multifunction Peripheral). Image forming apparatus 2 includes operation panel 21, manuscript reading part 22, memory part 23, image processing part 24, printing part 25, communication part 26, facsimile part 27, and control part 28.

Operation panel 21 is provided with a touch panel and a manual operation button. The touch panel includes various operation keys and a touch sensitive sensor. The touch sensitive sensor may be provided on surface of a display part that displays an image formation situation. Thereby, it functions as the display part and an input part. The touch panel detects touch operation to a display surface. The touch panel outputs signals corresponding to a position where the touch operation is detected. Thereby, a touch panel accepts an operation to the operation key displayed on the display part. Also, the manual operation button is provided with various operation keys, such as a numeric keypad, a reset key, a stop key, and a start key. The numeric keypad inputs numerical values, such as printing number of sheets. The reset key inputs an instructions that make setup information initialize. The stop key stops copying operation. The start key inputs an output instruction that makes print operation start.

Manuscript reading part 22 is a scanner that irradiates with light to a manuscript, receives reflected light, and reads a manuscript image. The manuscript is paper-fed by the manuscript sheet feeding device, which is not illustrated. Also, the manuscript may be placed on platen glass by the user.

Memory part 23 is a non-transitory recording medium. In memory part 23, image data, or the like, are accumulated. Image data is obtained by reading by manuscript reading part 22. Also, image data is received by communication part 26 and facsimile part 27.

Image processing part 24 performs specified image process to the image data. In image processing part 24, for example, a scaling process, an image improvement process of density control or gradation adjustment, or the like, is performed.

Printing part 25 is a printing part that prints the image data memorized in memory part 23. Printing part 25 forms, for example, a latent image on a surface of a photo conductor drum based on the image data read from memory part 23. Also, printing part 25 performs image formation that makes the latent image to a toner image with toner. Also, printing part 25 makes a recording paper transfer the toner image from the photo conductor drum. Also, printing part 25 fixes the toner image to the recording paper and discharges it.

Communication part 26 has a function that transmits and receives various data to portable terminal 1 via the wireless network. Otherwise, communication part 26 may have a function that transmits and receives various data to an external terminal.

Facsimile part 27 has a facsimile transmitting function that transmits a generated facsimile signal via a public network. Therefore, facsimile part 27 has a modem. Facsimile part 27 generates the facsimile signal from the image data. This image data is read by manuscript reading part 22 or is memorized in memory part 23. Also, facsimile part 27 has a facsimile reception function that receives a facsimile signal via a public network.

Control part 28 is connected to operation panel 21, manuscript reading part 22, memory part 23, image processing part 24, printing part 25, communication part 26, and facsimile part 27, respectively. Control part 28 is an information processing part provided with the non-transitory recording medium. The control program for operation-controlling image forming apparatus 21 is memorized in the recording medium. Control part 28 reads the control program memorized in the recording medium and expands the control program. Thereby, a whole device is controlled. Also, control part 28 controls the whole device based on received setting operation information from portable terminal 1 via communication part 26. Therefore, control part 28 functions as operation processing part 281.

Figure 4:
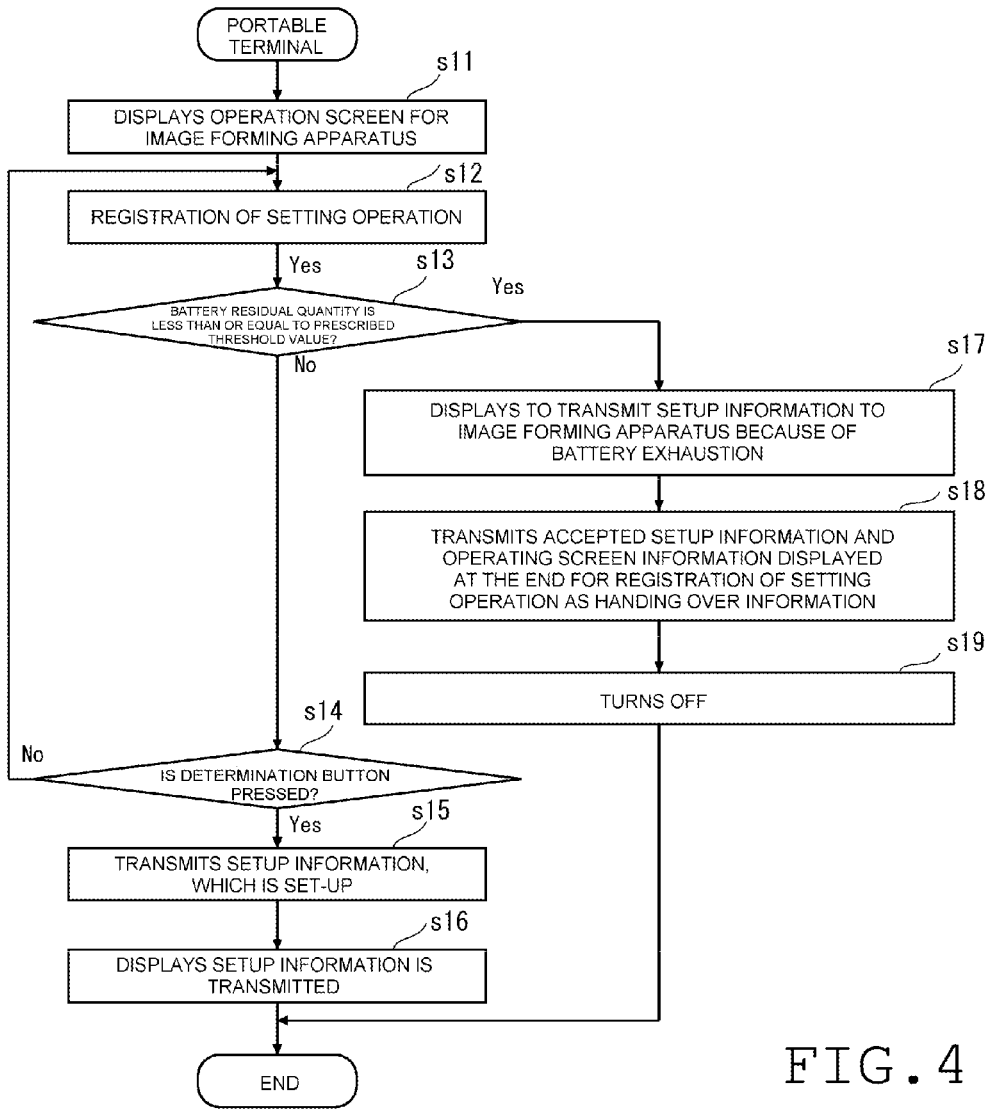
FIG. 4 is a flow chart showing a process flow of the portable terminal illustrated in FIG. 2.
Figure 5:
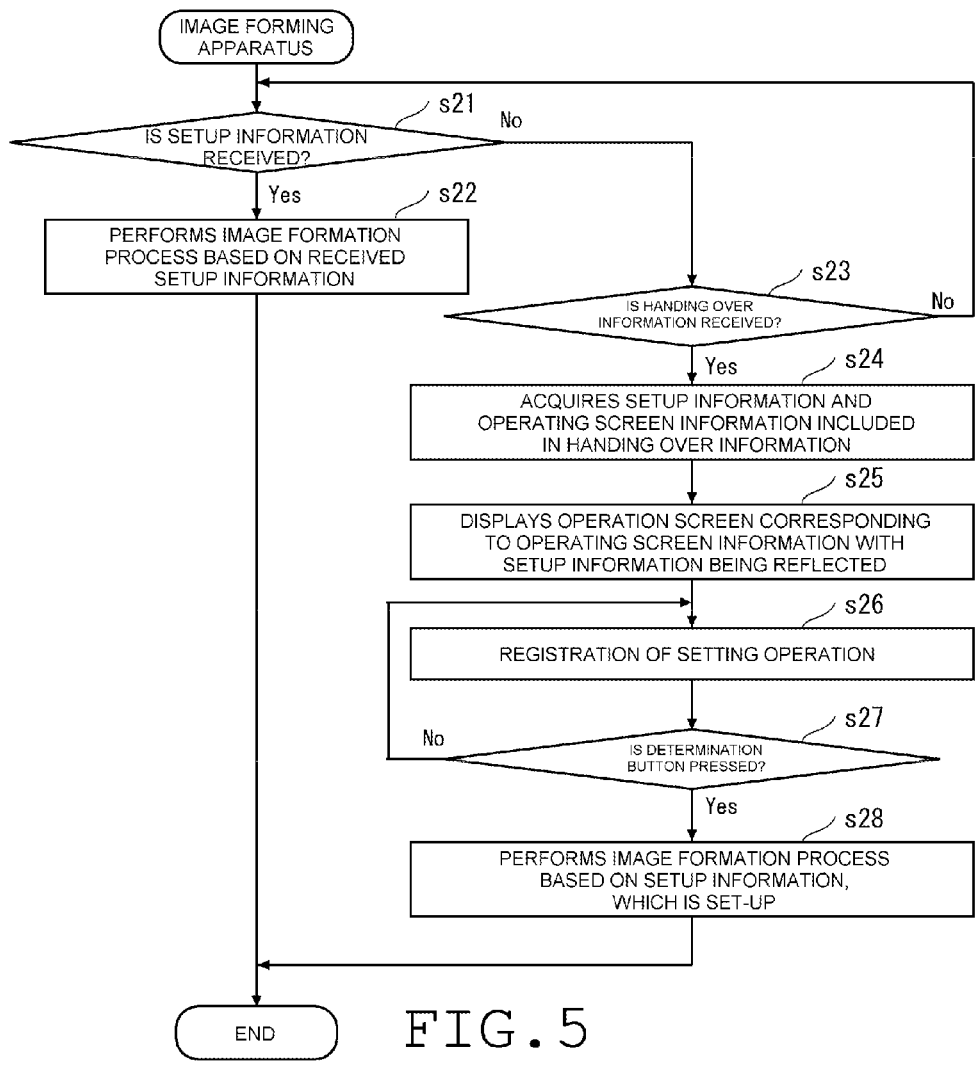
FIG. 5 is a flowchart showing a process flow of the image forming apparatus illustrated in FIG. 3.
Figure 6A:
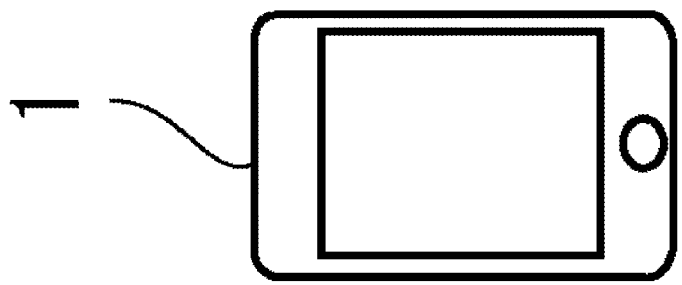
FIG. 6A is an image figure showing a process flow of the image forming system illustrated in FIG. 1.
Figure 6B:
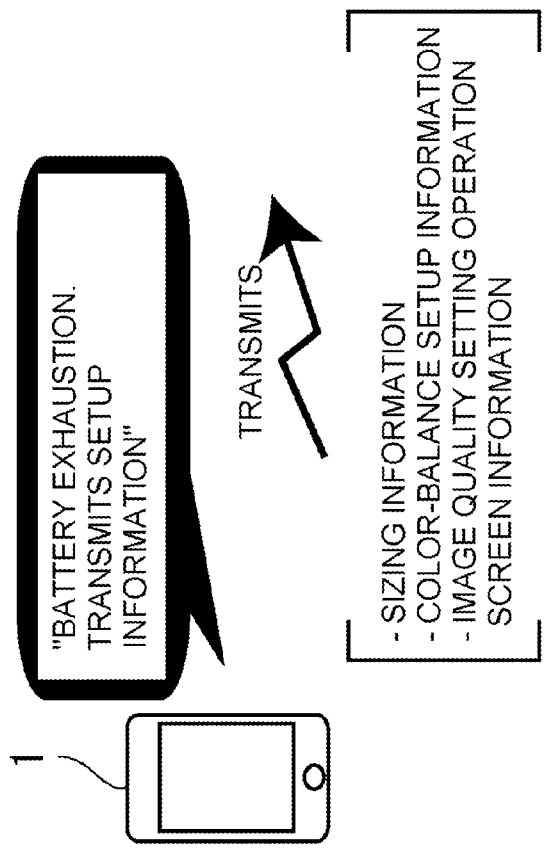
FIG. 6B is an image figure showing a process flow of the image forming system illustrated in FIG. 1.
Figure 6B:
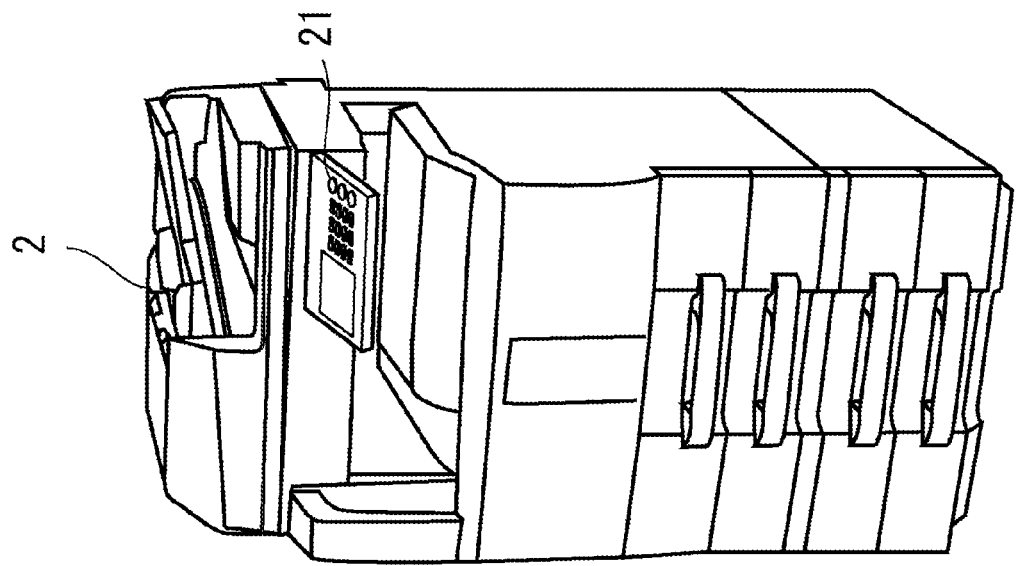

In detail, with reference to FIG. 4-FIG. 6, a process flow of image forming system 100 is explained.

FIG. 4 is a flowchart that shows a process flow of remote control processing part 151 in portable terminal 1.

Remote control processing part 151 displays the operation screen that accepts the setting operation to image forming apparatus 2 on operation part 11 (Step s11). Remote control processing part 151 accepts setting operation via the operation screen (Step s12). Continuing, remote control processing part 151 determines whether the battery residual quantity of portable terminal 1 is equal to or less than the prescribed threshold value via battery residual quantity monitoring part 12 (Step s13). This prescribed threshold value is very last battery residual quantity. That is, it is a possible value that, in Step s16 and Step s17, which are described later, can display a message to image forming apparatus 2 and can transmit accepted setup information and screen information of the setup information accepted at the end to image forming apparatus 2.

If the battery residual quantity is not less than or equal to the prescribed threshold value (No at Step s13), remote control processing part 151 determines whether the determination button that confirms setting operation in portable terminal 1 is pressed (Step s14). If the determination button is not pressed (No at Step s14,) a process is returned to Step s12. If the determination button is pressed (Yes at Step s14,) remote control processing part 151 transmits the setup information set up via the operation screen to image forming apparatus 2 (Step s15). Then, remote control processing part 151 displays setup information being transmitted on operation part 11 (Step s16) and ends the present process.

On the other hand, if battery residual quantity becomes less than or equal to the prescribed threshold value (Yes at Step s13,) remote control processing part 151 displays to transmit the setup information to image forming apparatus 2 because of battery exhaustion (Step s17). Remote control processing part 151 transmits handing over information to image forming apparatus 2 (Step s18). This handing over information includes setup information that has been accepted (input) via the operation screen and an operating screen information that has displayed at the end for registration of setting operation.

In this time, for a screen display of setup information being transmitted at Step s17, it may display displays only a message with the screen background is black. Thereby, electric power consumed by screen-display can be saved. Also, furthermore, until very last battery residual quantity being lost, it can be possible to perform the setting operation in portable terminal 1. Also, the process of Step s18 may be performed on background process at Step s17.

Received setup information and the operating screen information displayed at the end for registration of setting operation are transmitted to image forming apparatus 2. In that case, power supply of portable terminal 1 is turned off (Step s19), and the present process is completed.

Next, with reference to FIG. 5, a process flow of operation processing part 281 in image forming apparatus 2 is explained.

Operation processing part 281 determines whether setup information is received from portable terminal 1 (Step s21). Operation processing part 281, if the setup information is received (Yes at Step s21,) an image formation process is performed based on the received setup information (Step s22). Then, operation processing part 281 ends the present process.

On the other hand, if the setup information is not received (No at Step s21,) operation processing part 281 determines whether the handing over information is received from portable terminal 1 (Step s23). If operation processing part 281 has not received the handing over information, either, (No at Step s23,) a process is returned to Step s21.

On the other hand, if the handing over information is received (Yes at Step s23), operation processing part 281 acquires the setup information and the screen information that are included in the handing over information (Step s24). The setup information included in the handing over information is setup information accepted by portable terminal 1 just before battery exhaustion. Also, the operating screen information included in the handing over information is the operating screen information displayed at the end with portable terminal 1 for registration of the setting operation.

Then, operation processing part 281 displays an operation screen corresponding to the operating screen information on operation panel 21 (Step s25). In this case, the acquired setup information is in a reflected state. Then, operation processing part 281 accepts setting operation (Step s26). Therefore, the user can operate it with continuing the setting operation in portable terminal 1. In addition, the operation screen configuration for accepting the setting operation in portable terminal 1 and the operation screen configuration for accepting the setting operation in image forming apparatus 2 are corresponded. This includes the case where the operation screen of portable terminal 1 configures more larger screen and clearly visible than the operation screen of operation panel 21.

Continuing, operation processing part 281 determines whether the determination button of operation panel 21 is pressed (Step s27).

If the determination button of operation panel 21 is not pressed (No at Step s27,) operation processing part 281 returns a process to Step s26. If the determination button of operation panel 21 is pressed (Yes at Step s27), operation processing part 281 performs the image formation processing based on the setup information, which is set up (Step s28). Then, operation processing part 281 ends the present process.

For example, as shown in FIG. 6A, it explains the case where the user has been finished "1. SIZING" and "2. COLOR-BALANCE SETUP" with portable terminal 1 and it is in time of setting operation for "3. IMAGE QUALITY SETUP." At this time, as shown in FIG. 6B, if the battery of portable terminal 1 becomes less than or equal to the prescribed threshold value, a message, "Battery exhaustion. Transmits Setup information", is displayed on operation part 11 of portable terminal 1. Then, "sizing information", "color-balance setup information", and "image quality setting operation screen information," which have already been set, are transmitted to image forming apparatus 2 via wireless as handing over information. The image quality setting operation screen information is the operating screen information displayed at the end, in order to accept the setting operation. Also, as illustrated in FIG. 6C, image forming apparatus 2 receives the handing over information. In that case, image forming apparatus 2 displays an image quality setting operation screen on operation panel 21. In this case, it is in the state reflecting the received "sizing information" and "color-balance setup information."

That is, according to the present embodiment, while setting operation of image forming apparatus 2 is performed in portable terminal 1, even if portable terminal 1 becomes battery exhaustion, the handing over information is transmitted to image forming apparatus 2, automatically. The handing over information includes setup information and operating screen information. The setup information is information set up with portable terminal 1 just before battery exhaustion. The operating screen information is information of a screen that is displayed at the end for the setting operation. Image forming apparatus 2 accepts operation with operation panel 21 based on the handing over information received from portable terminal 1. In this case, operation is accepted from a continuation of the setting operation performed with portable terminal 1. Therefore, even if portable terminal 1 becomes battery exhaustion, operation with portable terminal twill not be useless. That is, the operation information on portable terminal 1 is handed over to image forming apparatus 2, and the operation is enabled. Thereby, for example, when contact address registered only in the address book of portable terminal is set up with portable terminal 1 as a transmission destination of a facsimile, even if portable terminal 1 becomes battery exhaustion, it can be supported. That is, transmission destination information can be handed over to image forming apparatus 2.

With explaining in detail, in a typical example, if a portable terminal becomes battery exhaustion, print setting is to be re-input with the image forming apparatus. Therefore, there is a problem that the operation in the portable terminal becomes useless. As compared with this, according to the present disclosure, if a portable terminal is likely to become battery exhaustion, an operation information of the portable terminal can be handed over to an image forming apparatus and can continue to be operated.

The present disclosure is not limited to the embodiment as mentioned above, and it cannot be overemphasized that it can change of all sorts in the range that does not deviate from the aim of the present disclosure.

Also, user information of portable terminal 1 may include handing over information. Also, when an operator of portable terminal 1 logs in to image forming apparatus 2, the handing over information associated with the user information may be read. Also, further, it may enable to operate with operation panel 21. Also, the handing over information includes position information of a cursor on an operation screen displayed at the end on the portable terminal for the setting operation. In this case, operation panel 21 displays the cursor on the position corresponding to the position information of the cursor on the screen corresponding to the operating screen information. According to this, when operating with image forming apparatus 2, operation can be started from the same input position. That is, operation can be started in the last input position (position of the cursor) on the operation screen displayed at the end with portable terminal 1.

Also, remote control processing part 151, the prescribed threshold value may be differentiated according to amount of the handing over information. For example, the amount of setup information that transmits to image forming apparatus 2 increases, so that the received amount of setup information increases, and thus the amount of battery exhaustion also increases. Therefore, the prescribed threshold value may be set up highly, so that the received amount of setup information increases.

What is claimed is:

1. An image forming system comprising:
   a portable terminal; and
   an image forming apparatus that allows operation of the image forming apparatus from the portable terminal; wherein:
      the portable terminal has a remote control processing part that transmits handing over information for handing over operation to the image forming apparatus, even though a setting is not completed, when battery residual quantity becomes less than or equal to a prescribed threshold value;
      the image forming apparatus has an operation panel that accepts operation for continuing setting operation performed with the portable terminal based on the handing over information received from the portable terminal;
      the handing over information includes setup information set up with the portable terminal and operating screen information displayed at end on the portable terminal for the setting operation, even when the setting operation of the operating screen is not completed;
      the operating screen information includes position information of a cursor on the operation screen displayed on the portable terminal for the setting operation,
      the operation panel displays a screen corresponding to the operating screen information, where the setup information is adopted, and the screen includes a cursor on a position corresponding to the position information of the cursor on the operation screen of the portable terminal; and
      the portable terminal has a display part that, when the battery residual quantity becomes less than or equal to the prescribed threshold value, displays a message indicating a transmission of the setup information.

2. The image forming system according to claim 1, wherein
   the prescribed threshold value is differentially set according to amount of the handing over information.

3. The image forming system according to claim 2, wherein, the prescribed threshold value is a battery residual quantity by which the remote device can display a message and can transmit accepted setup information and lastly accepted operation screen information to the image forming apparatus.

4. The image forming system according to claim 1, wherein
   the handing over information includes user information, and
   the operation panel accepts operation for continuing the setting operation performed with the portable terminal based on the handing over information corresponding to the user information for a login user.

5. An image formation method executed by an image forming system having a portable terminal and an image forming apparatus that allows operation of the image forming apparatus from the portable terminal, comprising the steps of:
   displaying a message and transmitting handing over information by the portable terminal for handing over operation to the image forming apparatus, even though a setting is not completed, when battery residual quantity becomes less than or equal to a prescribed threshold value; and
   accepting operation by an operation panel of the image forming apparatus for continuing setting operation performed with the portable terminal based on the handing over information received from the portable terminal, wherein:
   the handing over information includes setup information set up with the portable terminal and operating screen information displayed at end on the portable terminal for the setting operation, even when the setting operation of the operating screen is not completed,
   the operating screen information includes position information of a cursor on the operation screen displayed on the portable terminal for the setting operation,
   the operation panel displays a screen corresponding to the operating screen information, where the setup information is adopted, and the screen includes a cursor on a position corresponding to the position information of the cursor on the operation screen of the portable terminal, and
   the message indicates a transmission of the setup information.

6. The image formation method according to claim 5, wherein the remote terminal increases the prescribed threshold value as the amount of setup information increases.

* * * * *